United States Patent [19]
Crandall

[11] 3,920,186
[45] Nov. 18, 1975

[54] SWING PIPE ASSEMBLY FOR REMOVABLE GAS DIFFUSER

[75] Inventor: Robert E. Crandall, Greendale, Wis.

[73] Assignee: Envirex Inc., Waukesha, Wis.

[22] Filed: Aug. 12, 1974

[21] Appl. No.: 496,573

[52] U.S. Cl. .............. 239/280.5; 239/566; 239/587
[51] Int. Cl.² ...................... B05B 15/08; B05B 1/20
[58] Field of Search ........ 239/280.5, 450, 566, 587, 239/588, 602

[56] References Cited
UNITED STATES PATENTS

| | | | |
|---|---|---|---|
| 192,728 | 7/1877 | Bailey | 239/587 X |
| 965,709 | 7/1910 | Hart | 239/587 |
| 1,971,262 | 8/1934 | Hendricks | 239/587 X |
| 2,240,392 | 4/1941 | Dowell | 239/587 X |
| 3,334,819 | 8/1967 | Olavson | 239/602 X |
| 3,669,362 | 6/1972 | Meyerhofer et al. | 239/587 |

FOREIGN PATENTS OR APPLICATIONS

| | | | |
|---|---|---|---|
| 34,378 | 1/1929 | France | 239/587 |
| 885,561 | 5/1943 | France | 239/280.5 |
| 1,336,485 | 7/1963 | France | 239/587 |

*Primary Examiner*—Robert S. Ward, Jr.

[57] ABSTRACT

The fixed joint of the swing diffuser assembly includes a tee connected to the gas supply line. The swing joint includes a second tee. The upper leg of the swing diffuser comprises dual parallel pipes having elbows turnable in the ends of the tees. The dual pipes together comprise the upper leg and with the two joints provide the structural rigidity which particularly allows the joints to be constructed of molded plastic and the pipe of reinforced resin.

5 Claims, 2 Drawing Figures

SWING PIPE ASSEMBLY FOR REMOVABLE GAS DIFFUSER

BRIEF SUMMARY OF THE INVENTION:

A fixed gas supply tee and a second tee are connected at their corresponding ends by spaced parallel pipes having elbows. A third pipe connects the second tee and a gas diffuser header. Each pipe with elbows form identical rigid assemblies. The elbows are turnable in the ends of the tees whereby the header may be raised and lowered as required. The rotatable bearing between each elbow and the respective tees and the torsional rigidity of the pipes provide the firm support of the header in any selected position allowed by the assemblies.

Figure 1:
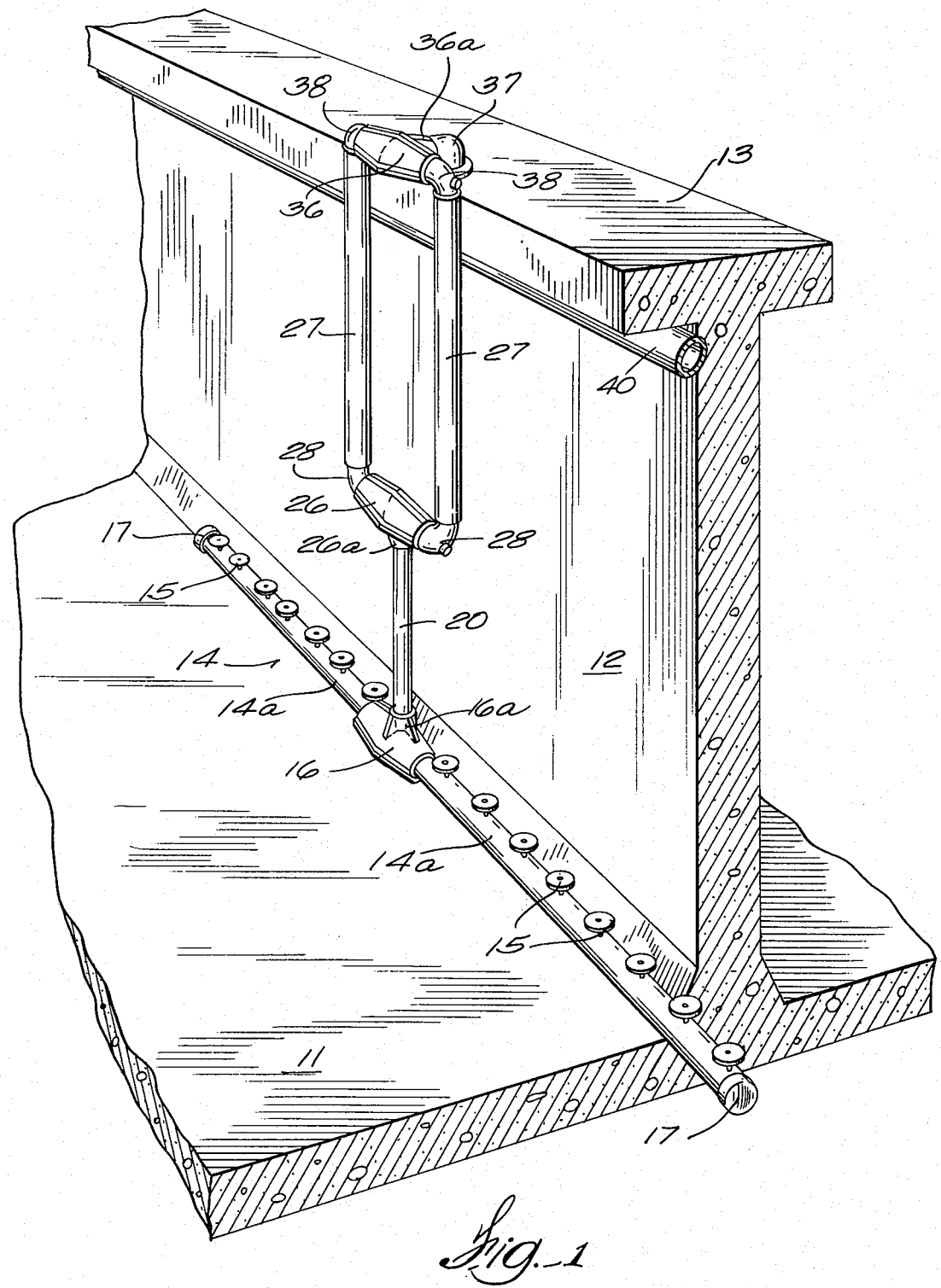
FIG. 1 is a perspective view of the diffuser in the lower position in a tank which is shown in part and which is broken away and sectioned.

DETAILED DESCRIPTION:

The concrete structure shown in part in FIG. 1 includes the bottom 11 and dividing wall 12 of adjacent tanks. Wall 12 supports the walkway 13 along the top of the wall. The horizontal header 14 in the foreground tank is fitted with the series of gas diffusers 15 and comprises separate sections 14a which are joined by the tee 16 at their nearer ends and which are closed by the caps 17 at their farther ends.

The lower end of pipe 20 is connected to the center connection or lateral 16a of tee 16 and the upper end of pipe 20 is connected to the lateral 26a of the tee 26. The opposite ends 26b of tee 26 are connected to the lower ends of the two parallel pipes 27 by the elbows 28, and the ends 36b of tee 36 are connected by the elbows 38 to the upper ends of pipes 27.

The lateral 36a of tee 36 is connected by the pipe fixture 37 with the main gas supply line 40 which is supported by and runs alongside dividing wall 12. Tee 36 is stationary and set so that its ends (36b in FIG. 2) are horizontal and parallel to wall 12.

Figure 2:
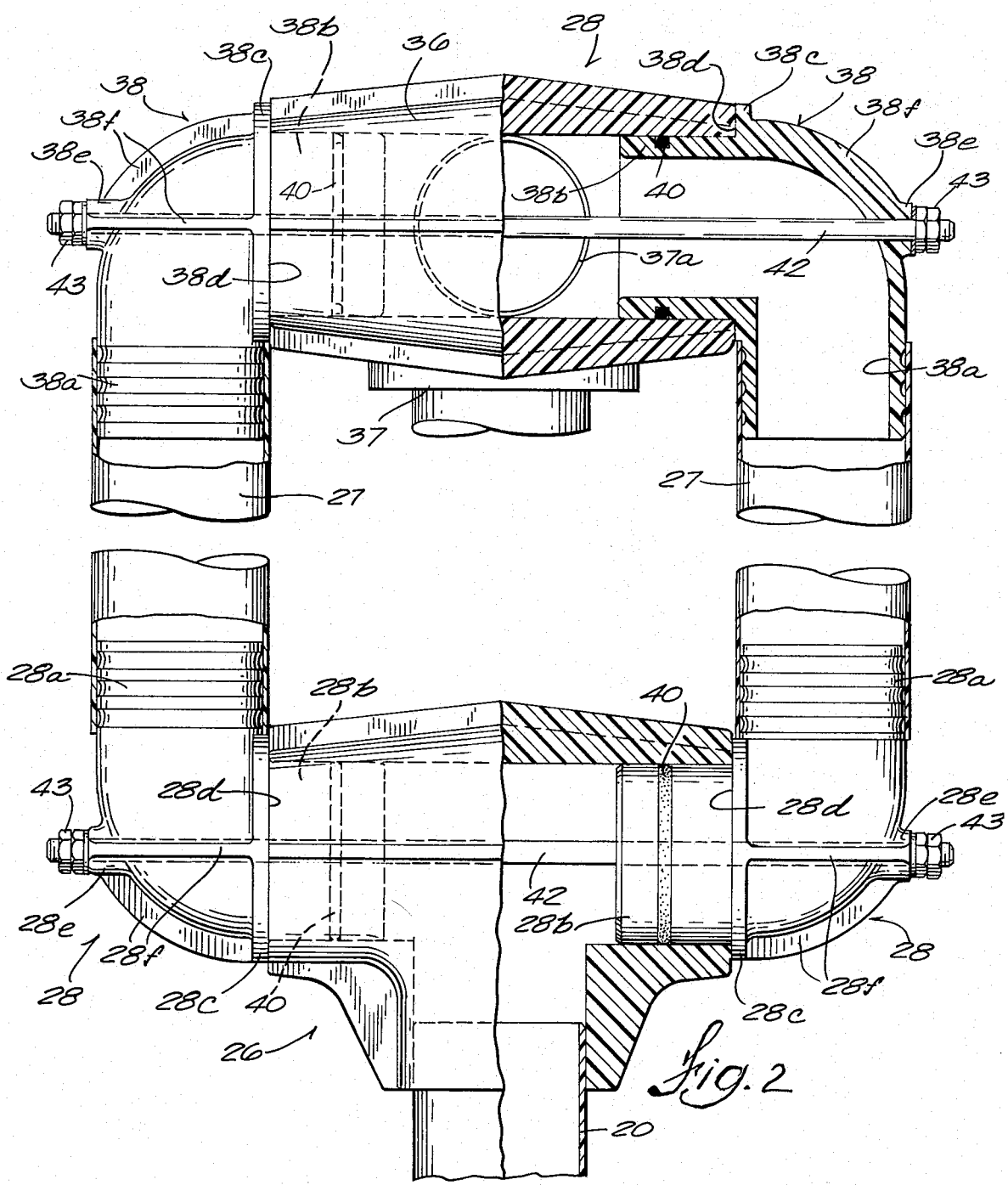
FIG. 2 is a view of the supply pipes with some parts in elevation and other parts broken away and sectioned. The plane of the view includes the parallel axes of the two joints.

As shown in FIG. 2, the two tees 26 and 36 are of identical molded plastic construction and may include whatever outer reinforcing ribs may be desired. The lateral 26a of tee 26 has a smooth bore to receive the end of pipe 20 which is bonded therein. The end 37a of fixture pipe 37 is similarly bonded in the bore of the lateral 36a of tee 36. It should be noted that the axis of these bores is parallel to header 14. The ends 26b of tee 26 have identical aligned bores and end faces 26c which are closely parallel and of a given spacing. The ends 36b of tee 36 have similar, identical aligned bores and parallel end faces 36c of the same given spacing. As previously indicated, the axis of these bores is horizontal and parallel to dividing wall 12.

As shown in FIG. 2, the four elbows 28 and 38 are of identical molded plastic construction and may include for example outer reinforcing ribs as shown. One end 28a of each elbow 28 is grooved for improved bonding in the selected end of a pipe 27 and the other end 28b is cylindrical for rotation in the bore of one end 26b of tee 26. Each end 28b is grooved to receive an O-ring seal ring 40 and adjoins the annular flange 28c and the axial bearing face 28d of the flange. Each elbow 28 also includes a boss 28e having a small bore which is coincident with the axis of end 28b of the elbow. The reinforcing ribs 28f of each elbow 28 extend from flange 28c to the boss 28e. Elbows 38 are also of identical construction and each includes the grooved end 38a, the cylindrical and grooved trunnion end 38b fitted with a seal ring 40, the annular flange 38c with bearing face 38d, boss 38e, and reinforcing ribs 38f.

In joining an elbow 28 with one end of a pipe 27 and an elbow 38 with the other end of pipe 27, the grooved ends 28a and 38a of the elbows are inserted and secured with a suitable bonding material in the ends of pipe 27 so that the annular faces 28d and 38d are in the same plane. This may be readily accomplished with a single rigid fixture, not shown, for example and provided with spaced annular surfaces in a single plane and to which the flanges 28c and 38c of each assembly may be clamped before the bonding material sets. The assembly of two pipes and elbows with the same fixture thus readily assures that the annular bearing faces 28d and 38d of each assembly are parallel and equally spaced. Assurance that the end faces of tees 26 and 36 are also parallel and equally spaced can be provided in the specifications for the mold, not shown, for forming the tees 26 and 36.

Generally, the tee 36 is first secured to pipe fixture 37. The header 14 with pipe 20 is then placed so that tees 26 and 36 are positioned to receive the ends 28b of elbows 28 and ends 38b of elbows 38. When assembled, a first tie rod 42 is inserted through the bosses 28e of elbows 28 and a second identical tie rod 42 is inserted through bosses 38e and elbows 38. The nuts 43 on the threaded ends of the rods are then turned to draw elbows 28 together and elbows 38 together to complete the swing diffuser assembly as shown in FIG. 1.

Tie rods 42 are preferably of stainless steel or other material so that the entire swing diffuser assembly may be corrosion resistant.

The tension applied to tie rods 42 does not affect the functioning of seal rings 40 but determines the rigidity of the arms. That is, the tie rods 42 push the flanges 28c and 38c of the elbows against the ends of the tees 26 and 36 respectively to whatever extent still allows their relative rotation insofar as may be required by whatever mechanism or means, not shown, is employed for lifting header 14 from the tank or lowering it into the tank.

The purpose in raising header 14 is to place the diffusers 15 of the header at a convenient level above the walkway 13 where they may be inspected and cleaned or replaced by maintenance personnel on the walkway. Accordingly, in lifting header 14 from the tank, the header 14 should remain horizontal and diffusers 15 should remain upright. This is readily assured by keeping pipe 20 substantially vertical as it and the header are moved in an arc away from dividing wall 12 and then upwardly to a position, not shown, above walkway 13.

The present invention has been developed for sewage aeration tanks which are typically in the order of 14 to 20 feet deep. Each header is typically up to 20 feet in length. The entire apparatus is thus of considerable size. The present invention might have use in the diffusion of gases other than air in liquids other than sewage, particularly because the entire assembly may be made of corrosion or chemical resistant plastics or resins, including the tie rod 42 and nuts 43. Also, if the diameter of ends 28b and 38b of the elbows and the diameter of the header sections 14a are similar and the end 37a of fixture 37 and the ends of pipe 20 are of the same diameter, tees 16, 26 and 36 may be identical to reduce the cost of the assembly.

I claim:

1. In a swing joint gas supply line for supporting a diffuser head in a tank containing the liquid in which the gas is to be diffused, a first tee having a relatively rotatable elbow at each end and a lateral adapted to be connected to a gas supply line so that the elbows are rotatable about a fixed horizontal axis parallel to the header, two parallel pipes having corresponding ends respectively connected to said elbows, a second tee having relatively rotatably elbows at its ends, said elbows being respectively connected to the corresponding other ends of said pipes, each end of each tee having a cylindrical bore, the two bores of each tee having the same axis, the end faces of the tee at the respective ends of said bores being parallel and normal to said axis, one end of each elbow forming a pipe connection and the other end being cylindrical and rotatably fitting within the bore of the corresponding end of the tee, each elbow further having an annular face immediate to the one end thereof and normal to the other end and adapted to engage the corresponding end face of the tee, a single pipe connecting the lateral of said second tee and the diffuser header, said two parallel pipes and the two elbows connected to each thereof forming identical rigid structures, each of said elbows and corresponding tees being assembled so that their respective annular faces are in axial bearing engagement, and a tie rod connecting the two elbows of each tee and securing said faces in bearing engagement whereby the header is firmly held parallel to said fixed axis while being raised to an upper position above the liquid for serving and lowered to its position in the tank for operation, said tie rod extending along the axis of the bores of each tee and concentrically respecting the annular faces in bearing engagement.

2. The apparatus of claim 1 wherein the first and second tees and the four elbows are of identical construction.

3. The apparatus of claim 2 wherein the header includes a third tee having its lateral connected to the lower end of the gas supply pipe and said three tees are of identical construction.

4. The apparatus of claim 2 wherein the turnable other end of each elbow includes a gas seal ring of resilient material.

5. The apparatus of claim 1 wherein the assembly is made of corrosion resistant material including as a class, molded plastic, resin and stainless steel.

* * * * *